(12) United States Patent
Eldada

(10) Patent No.: US 7,302,141 B2
(45) Date of Patent: Nov. 27, 2007

(54) Y-BRANCH-BASED THERMO-OPTIC DIGITAL OPTICAL SWITCHES AND VARIABLE OPTICAL ATTENUATORS WITH NON-UNIFORM HEATING

(75) Inventor: Louay Eldada, Lexington, MA (US)

(73) Assignee: E.I. du Pont de Nemors and Company, Wilmington, DE (US)

( * ) Notice: Subject to any disclaimer, the term of this patent is extended or adjusted under 35 U.S.C. 154(b) by 0 days.

(21) Appl. No.: 10/883,060

(22) Filed: Jun. 30, 2004

(65) Prior Publication Data

US 2005/0185890 A1    Aug. 25, 2005

Related U.S. Application Data

(60) Provisional application No. 60/484,364, filed on Jul. 2, 2003.

(51) Int. Cl.
*G02B 6/26* (2006.01)
*G02B 6/42* (2006.01)

(52) U.S. Cl. .................... 385/45; 385/4; 385/8; 385/9; 385/39; 385/40

(58) Field of Classification Search .................... 385/4, 385/8, 9, 39, 40, 45
See application file for complete search history.

(56) References Cited

U.S. PATENT DOCUMENTS

| | | |
|---|---|---|
| 5,623,566 A | 4/1997 | Lee et al. |
| 6,236,774 B1 | 5/2001 | Lackritz et al. |
| 6,526,193 B1 | 2/2003 | He et al. |
| 2002/0085791 A1* | 7/2002 | Kim ............................ 385/16 |

OTHER PUBLICATIONS

Hida et al. "Polymer Waveguide Thermooptic Switch with Low Electric Power Consumption at 1.3um". IEEE Phontonics Technology Letters, vol. 5, No. 7. Jul. 1993. pp. 782-784.*
Okayama, et al., "Reduction of Voltage-Length Product for Y-Branch Digital Optical Switch", Journal of Lightwave Technology, (1993), pp. 379-387, vol. 11, No. 2, Japan.
Eldada, et al., "Polymeric Components for All-Optical Networks", Proc. SPIE, (2000), pp. 78-89, vol. 3950, New Jersey.
Hida, et al., "Polymer Waeguide Thermooptic Switch With Low Electric Power Consumption at 1.3 um", IEEE Photonics Technology Letters (1993), pp. 782-784, vol. 5, No. 7.
Moosburger, et al., Proc. 21$^{st}$ Eur. Conf. on Opt. Comm., (1995), pp. 1063-1067, Abstract Only.
Diemeer, Mart B.J., "Polymeric Thermo-Optic Space Switches For Optical Communications", Optical Materials, (1998), pp. 192-200, vol. 9, The Netherlands.
L. Edada, Advances in Telecom and Datacom Optical Components, Opt. Eng., vol. 40(7); 1165-1178, 2001.
Patent Abstracts of Japan, vol. 1997, No. 12, Dec. 25, 1997 & JP 09 211501A (Nippon Telegr &Amp; Teleph Corp & LT;NTT;GT;), Aug. 15, 1997 & JP 03 188402A (Nippon Telegr & Teleph Corp. Aug. 16, 1991.
Patent Abstracts of Japan, vol. 1998, No. 05, Apr. 30, 1998 & JP 10 020348A, Nippon Telegr & Amp; Teleph Corp & LT;NTT>), Jan. 23, 1998, Abstract.

(Continued)

*Primary Examiner*—Frank G. Font
*Assistant Examiner*—Derek L. Dupuis

(57) ABSTRACT

The present invention is concerned with 1×2 thermo-optic digital optical switches known in the art as "Y-branch digital optical switches" and variable optical attenuators.

22 Claims, 6 Drawing Sheets

OTHER PUBLICATIONS

Patent Abstracts of Japan, vol. 2000, No. 12, Jan. 3, 2001 & JP 2000 241838A (Nippon Telegr & Teleph Corp), Sep. 8, 2000, Abstract.
R. Blomquist et al., Fluorinated Acrylates in Making Low-Loss, Low-Birefringence, and Single-Mode Optical Waveguides with Exceptional Thermo-Optic Properties, Proceedings of the SPIE—The International Society for Optical Engineering SPIE-Int. Soc. Opt. Eng USA, vol. 3799, Jul. 1999, pp. 266-279, XP002325316.

* cited by examiner

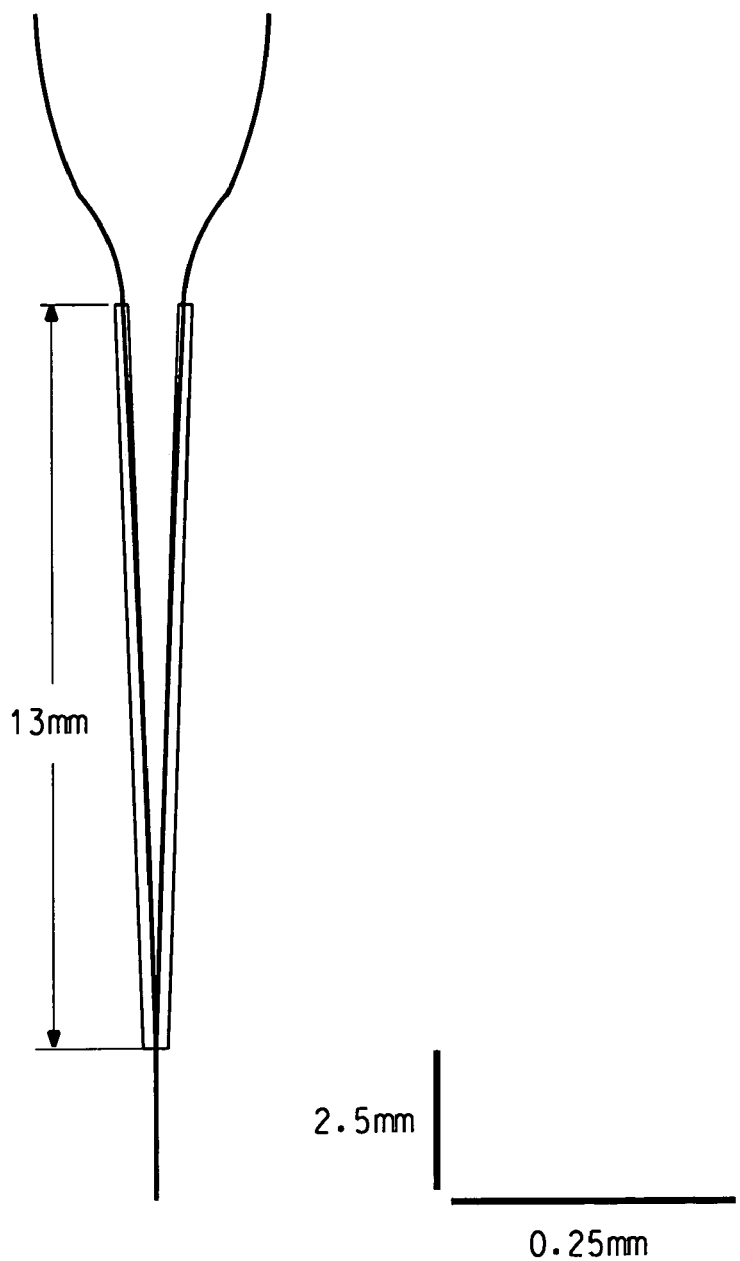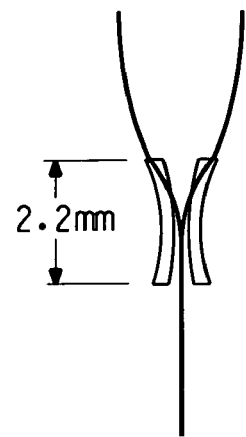
FIG. 2A
(Prior Art)
FIG. 2B

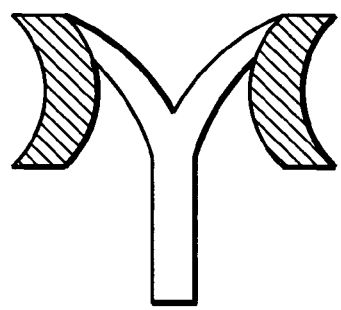
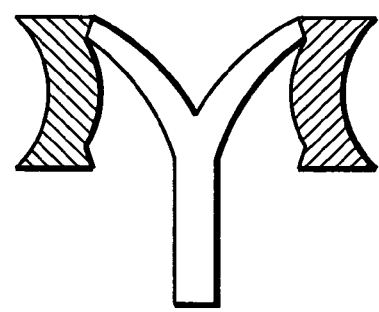
FIG. 4A          FIG. 4B
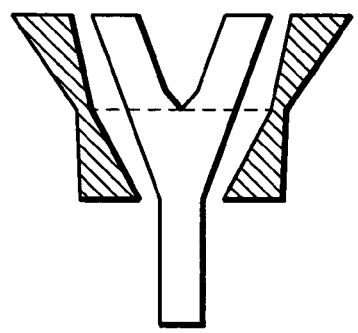
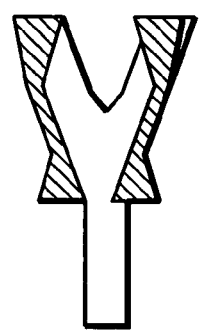
FIG. 5A
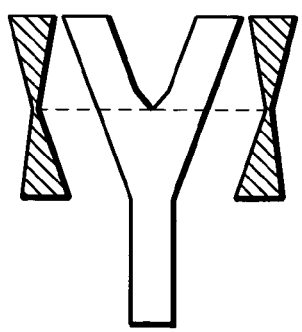
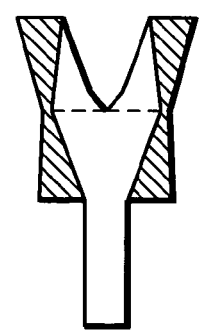
FIG. 5B

Y-BRANCH-BASED THERMO-OPTIC DIGITAL OPTICAL SWITCHES AND VARIABLE OPTICAL ATTENUATORS WITH NON-UNIFORM HEATING

FIELD OF THE INVENTION

The present invention is concerned with optical communications technology. More specifically, the present invention is concerned with 1×2 thermo-optic digital optical switches known in the art as "Y-branch digital optical switches" and variable optical attenuators.

TECHNICAL BACKGROUND

Digital optical spatial switches (DOS) are well known in the art. One class of such switches is the 1×2 digital optical switch known as a "Y-branch digital optical switch" (Y-branch DOS) wherein light input into the "base" or trunk of the Y is directed through one or the other of the output branches by virtue of changes effected in the refractive index of one or both of the output branches. The switch can also be operated in reverse, whereby one or the other "upper branches" of the Y can be selected as an input channel with the base of the Y being the output channel. Y-branches are a fundamental building block of optical circuitry, and may be employed singly, or in various combinations to form more complex switching and coupling devices.

The Y-branch DOS has received wide commercial acceptance primarily because of its robustness to variations in critical parameters such as electrical power applied, polarization, wavelength, temperature, and to a large extent, even device geometrical variations. Typically a Y-branch DOS is designed such that two waveguide branches intersect to define a Y-shape structure with a very small angle at the intersection of the branches. The composition of the waveguide structure may include a wide variety of materials such as lithium niobate, semiconductors, silica, or polymers. A Y-branch DOS performs its switching function by adiabatically changing (i.e. slowly varying, as opposed to abruptly altering) the light propagation direction in one of the output waveguides.

Specifically, switching in a Y-branch DOS is achieved by forcing a refractive index change in one waveguide branch with respect to the other. The change in refractive index may be induced by applying for example voltage and/or current to selected sections of the structure. Of particular significance among the characteristics of a Y-branch DOS is its step-like response to applied voltage or current, which allow the light to remain in a higher index branch, notwithstanding an increase in the applied voltage or current beyond the switching threshold. When a Y-branch DOS operates above the switching threshold, variations in polarization and wavelength do not impact significantly the switching capacity of the Y-branch DOS.

One persistent problem presented to the designer by the Y-branches of the art is footprint. In order to effect the adiabatic transfer of energy, known in the art as adiabatic modal transfer (AMT), of the propagating wave into the single output channel selected, it is necessary to maintain a separation of the two output branches of no greater than ca. 30 times the wavelength of the propagating signal for a silica-fiber-level of refractive index difference in the waveguide of ca. 0.5% of the base index. For 1.5-micron radiation, this means that the separation between the two branches must be maintained at a distance on the order of 45 micrometers or less until the energy transfer is complete. This requirement in turn necessitates very small vertex angles on the order of 0.1 to 0.3 degrees and device lengths up to 30 mm. Controlled fabrication of such devices is quite difficult and error prone. Furthermore, the large footprint of such devices greatly limits their applicability in integrated optical circuitry.

One approach to addressing these problems is provided by Okayama et al, J. Lightwave Tech. 11 (2), 379-387 (1983), in which a two angle shaped Y-branch DOS wherein the output waveguides initially diverge by an angle of ca. 2° and then undergo a bend to a smaller extrapolated angle of divergence of ca. 0.3°.

Several methods are known in the art for effecting the desired change in refractive index. These involve the electro-optic effect, the stress-optic effect and the thermo-optic effect. In a typical Y-branch thermo-optic DOS known in the art, the two upper branches of the "Y" are provided with a heating means, typically a thin layer of metal deposited thereupon, which heating means when activated induces a shift in the refractive index of the corresponding branch, thereby effecting a coupling of power input to the base of the "Y" to one or the other branches. By turning on the heating of one branch and turning off the heating of the other branch, switching of incoming optical signals can be effected.

Both polymeric and glass Y-branches are known. Because of the much larger temperature dependence of the refractive index of polymers, polymers are preferred for use in thermo-optic digital optical switches.

Hida et al, IEEE Photonics Technology Letters 5 (7), 782-784 (1997), disclose polymeric 2×2 thermo-optic switches consisting of two coupled Y-branches fabricated from deuterated and fluoro-deuterated methacrylate polymers. The method of fabrication involves spin coating polymer solutions onto a silicon substrate followed by forming the Y-shaped components by conventional photolithography, the core ridges being subsequently formed by reactive ion etching. Chromium thin-film strip heaters were formed on the upper Y-branches by electron beam evaporation and wet etching. Separation of the arms was 250 micrometers. The Cr heater strips were 5 mm long and 50 micrometers wide.

Eldada et al, Proc. SPIE, vol. 3950, pp. 78-89 (2000), discloses 1×2 optical switches fabricated from polymeric materials which Y-branches exhibit 0.1 dB insertion loss for vertex angles of less than 2°. The direct photolithographic fabrication method using halogenated acrylates as practiced therein is disclosed to enable sharp profiles of the components and the removal of residue even at the vertex of relatively small angle Y-branches.

Lackritz et al, U.S. Pat. No. 6,236,774B1, discloses thermo-optic switches employing cross-linked polymeric waveguides operated above $T_g$. Disclosed are metallic heaters substantially rectangular in shape disposed upon a polymeric optical waveguide surface, the long side of said rectangular heater being positioned at a slight angle to the direction of propagation in the waveguide. Said heaters are positioned to be in uniform thermal contact with waveguide material over the entire area of the heater. It is disclosed that the temperature, and therefore the refractive index, of the polymer waveguide material will depend upon the distance of any point therein from the heater, those regions closest to the heater experiencing greater temperature than those further away.

He et al, U.S. Pat. No. 6,526,193 B1, discloses the electro-optic effect in a Y-branch digital optical switch having curved output waveguides provided with curved electrodes to provide a shorter device than achievable in the earlier art which employed diverging straight waveguide sections. The curvature of the output waveguides provides a continuously increasing angle of divergence.

Lee et al, U.S. Pat. No. 5,623,566, is drawn to thermally induced guides in silicon optical benches. Disclosed in FIG. 2 thereof is the temperature profile through the various optical materials employed therein as a result of localized heating applied thereto.

Moosburger et al, Proc. $21^{st}$ Eur. Conf. on Opt. Comm, pp. 1063-1067 (1995) disclose Y-branches with "near perfect" vertices having an angle of 0.12° fabricated from silica-clad polymeric waveguides having cores of ca. 9 micrometers. The upper branches of the Y were coated with Ti thin film heaters. 27 dB cross-talk suppression was achieved between output branches with heater power of ca. 180 mW. Moosburger expressly teaches that blunted vertices induce losses and reduce the crosstalk suppression between output waveguides.

Diemeer, Optical Materials 9, 192-200 (1998) provides a thoroughgoing analysis of the thermal transport and physical aspects of thermo-optic switching in polymeric vs. silica thermo-optic digital optical switches. For polymers in general, and polycarbonate and polymethylmethacrylate in particular, it is shown that switching power lies in the range of 50-100 mW, and that a temperature rise of ca. 10° C. in the waveguide core is necessary to achieve a minimum refractive index difference of ca. 0.001.

SUMMARY OF THE INVENTION

The present invention provides for a 1×2 planar optical waveguide signal splitter in the form of a Y-branch comprising a trunk and two branches conjoined thereto to form a vertex, said branches diverging from one another, each of said branches having a surface, at least one of said branches being provided with a heating means, said heating means being disposed with respect to the at least one of said branches such that upon activation of said heating means, a spatially non-uniform heat flux will be incident upon said at least one of said branches.

Further provided in the present invention is a method for effecting an optical switching function, the method comprising:

(a) disposing in the propagation path of a propagating optical signal a 1×2 planar optical waveguide signal splitter in the form of a Y-branch comprising a trunk and two branches conjoined thereto to form a vertex, said branches diverging from one another, at least one of said branches being provided with a heating means, said heating means being disposed with respect to the at least one of said branches such that upon activation of said heating means, a spatially non-uniform heat flux will be incident upon said at least one of said branches;

(b) energizing said heating means to effect the imposition of a spatially non uniform heat-flux upon the surface of said at least one of said branches in order to raise the temperature of said at least one of said branches an amount sufficient to cause a change in the relative intensity of the propagating optical signal in the two said branches.

BRIEF DESCRIPTION OF THE FIGURES

FIGS. 2a and 2b depict schematically one of many possible embodiments of a Y-branch of the art and one of many possible embodiments of a Y-branch of the present invention, respectively.

FIGS. 4a and 4b depict two of many possible embodiments of the present invention wherein the heaters are of substantially uniform cross-section.

FIGS. 5a and 5b depict two of many possible specific embodiments of the most preferred embodiment of the present invention wherein the heaters are of non-uniform cross-section and the heaters are disposed along the outer edge of the branch.

DETAILED DESCRIPTION OF THE INVENTION

Figure 1A:
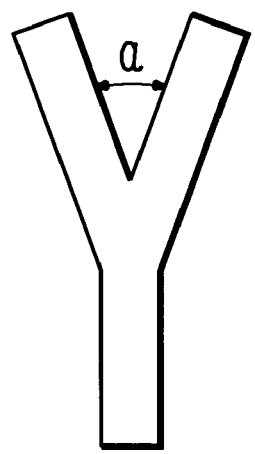
FIGS. 1a-1c depict some, but not all, designs for Y-branches which are suitable for the practice of the present invention.

The teachings of the art are clearly directed at employing the thermo-optic effect to effect switching by the imposition of an essentially spatially uniform heat flux to the surface of a planar optical waveguide, the heat thereby imposed inducing an increase in the temperature of the waveguide, thereby in turn causing a change in the refractive index, thereby in turn a change in the relative intensity of the optical signals propagating in the two branches of the Y. In particular, as taught in the art, when a certain temperature threshold is passed, the change in refractive index in the heated branch will be sufficient to effect an essentially complete shift of the optical signal into one or the other branch. In the practice of the present invention the cross-talk suppression between the two branches when the Y-branch of the invention is in the digital switching mode is at least 15 dB, preferably at least 20 dB, most preferably at least 25 dB.

Which branch is turned "on" and which "off" upon the application of heating depends upon the thermo-optic coefficient, dn/dT. In the case of inorganic glasses, most notably silica, dn/dT is positive, such that heating in the silica Y-branch results in switching of the propagating signal into the heated branch. Organic polymers exhibit a negative dn/dT so that heating in a polymeric Y-branch results in switching of the propagating signal into the unheated branch.

It is known in the art that the absolute magnitude of dn/dT for organic polymers exceeds that for inorganic glasses by ca. an order of magnitude. For this reason, organic polymers are highly preferred in thermo-optic switches. The description of the present invention is directed to the preferred organic polymer embodiments hereof. However, also contemplated within the scope of the present invention are Y-branches made of inorganic materials such as semiconductors and inorganic glasses, especially silica. One of skill in the art will appreciate that the same discussion will be Y-branches fabricated from inorganic materials keeping in mind the difference in sign and magnitude of dn/dT.

For the purpose of succinctness, the discussion herein will treat the embodiment of the present invention in which an optical signal is input at the bottom of the Y and is then switched to one or the other of the branches in the upper part of the Y according to the present invention, the upper branches serving as alternative output branches. One of skill in the art will appreciate that the direction of propagation of the optical signal can be reversed without alteration of the central aspect of the present invention, namely the use of a spatially non-uniform heating profile to effect the necessary temperature change for switching to occur.

In the reverse embodiment, light is input into one or the other upper branches of the Y, and the thermo-optic effect as described herein is employed to determine which branch of the Y will permit propagation of its input signal into the output trunk at the bottom of the Y.

The present invention further encompasses those embodiments in which neither output branch is sufficiently heated to effect complete switching of the incident optical power to one or the other output branches, but instead achieves a continuously variable intermediate state in which the ratio of optical power propagating in the two branches may be varied continuously between the extremes of "on" and "off," thereby providing not a digital optical switch but rather a variable optical attenuator.

Figure 1B:
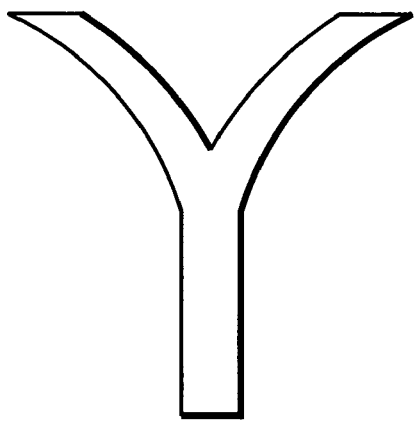

The present invention is equally applicable to Y-branches of many varying designs. Suitable Y-branch designs include but are not limited to Y-branches having straight output waveguides diverging at a fixed angle from a well-defined vertex having an angle, $\alpha$, as shown in FIG. 1a; Y-branches having outwardly curved output branches as shown in FIG. 1b; Y-branches having a blunted vertex, FIG. 1c, wherein the output waveguides initially diverge in a first straight section from a vertex at an angle, $\beta$, and then undergo a slight bend, which may be on the inside edge only as shown, or on both inside and outside edges, to form second straight section such that the second straight sections of the output waveguides diverge with a smaller angle, $\gamma$. In preferred embodiments, $\alpha$ is 0.05-0.4 preferably 0.1-0.2°, $\beta$ is 0.2-4.0 preferably 0.4-1.0°, and $\gamma$ is 0.05-0.4 preferably 0.1-0.2°. In still another embodiment, the output waveguides may be curved, with the angle of divergence in one embodiment decreasing essentially logarithmically with distance from the vertex. In a limiting embodiment of the Y-branch depicted in FIG. 1c, $\beta$ may be 180°.

The Y-branches suitable for the practice of the invention may be prepared according to any of the well-known processes in the art. Particularly beneficial is the direct photolithographic process applied to a suitably transparent photoresistive polymer, as described in L. Eldada, Opt. Eng. 40, 1165 (2001). Because the photoresist polymer itself is utilized to form the waveguide, no reactive ion etching step is required as in the other processes of the art. Reactive ion etching is known to cause striations in the waveguide walls which lead to an aggravation of scattering loss and polarization dependent loss (PDL). Scattering loss and PDL are minimized by employing direct photolithography. The resultant waveguide according to the process taught by Eldada is a graded index polymeric waveguide which can reduce scattering loss and PDL in the propagating signal.

The inventor hereof has determined surprisingly that when a spatially non-uniform heat flux is imposed upon the surface of one or the other of the output branches according to the present invention, AMT may be achieved over a shorter distance than is achievable according to the teachings of the art. An embodiment of the known art which represents typical practice is shown in FIG. 2a wherein a Y-branch intended for use at 1.55 micrometers incident light undergoes spatially uniform heating to achieve switching. In order to maintain the necessary separation between the branches at less than 45 micrometers for a length sufficient to effect complete AMT requires a heated length of ca. 13 mm for the output branches. By contrast, according to the present invention, the heated length of the output branches may be in the range of as little as 1-3 mm. Several important benefits accrue therefrom. One benefit is reduced footprint as illustrated in FIGS. 2 and 3.

Figure 3A:
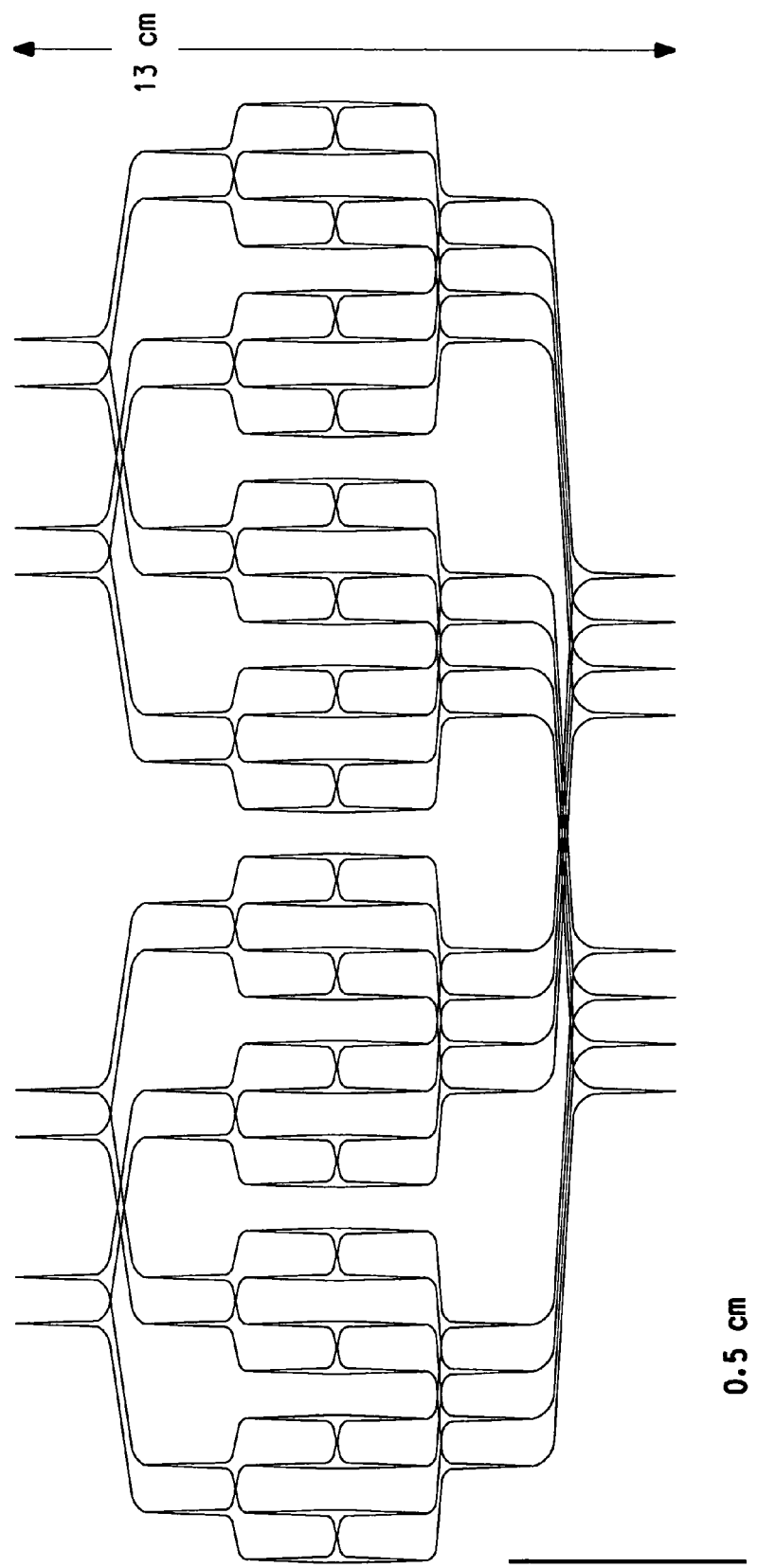
FIGS. 3a and 3b depict schematically a 112 Y-branch 8×8 optical switching device of the art and a 112 Y-branch 8×8 optical switching device of the present invention, respectively.
Figure 3B:
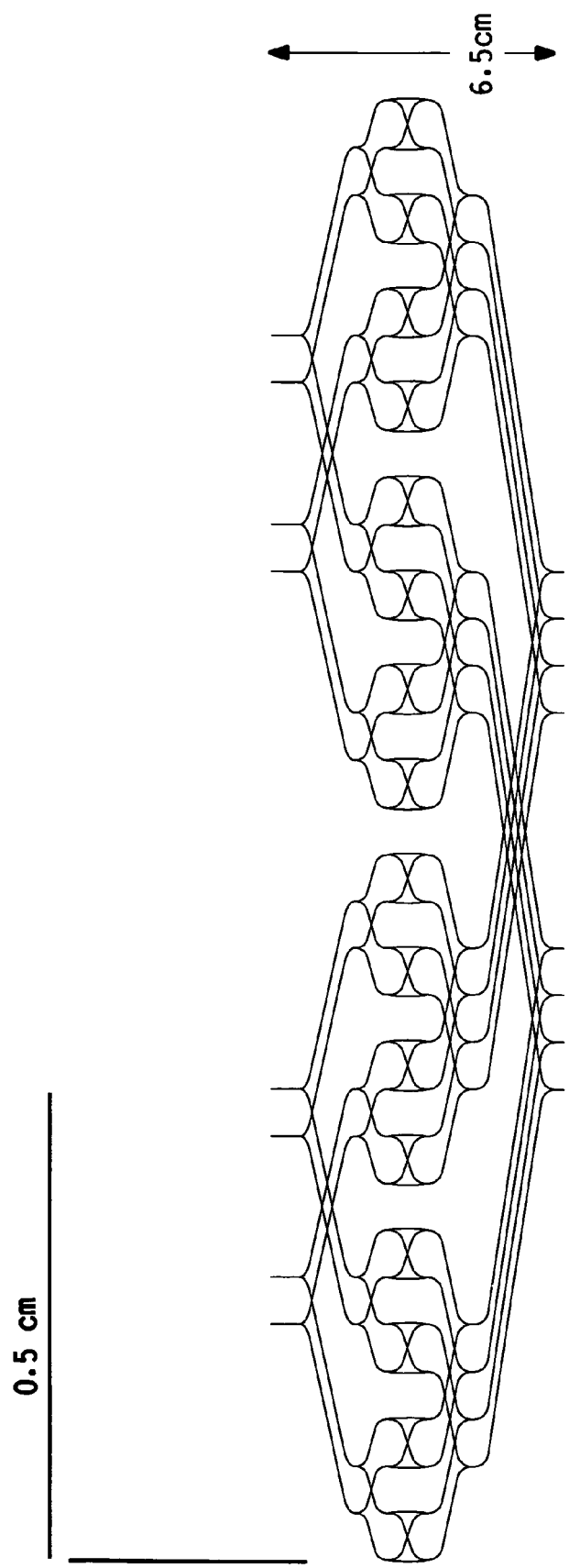

FIG. 2a depicts a Y-branch typical of that in the art. The heater length alone is 13 mm. The much smaller Y-branch of the invention depicted in FIG. 2b has a heater length of only 2.2 mm. FIG. 3 provides a real-world illustration of the improvement derived from the shorter footprint. FIG. 3a depicts a design for a 112 switch 8×8 switch array utilizing the Y-branch of the art. FIG. 3b depicts the same architecture but utilizing the Y-branch of the present invention, with a footprint half the size of that of the art.

A further benefit of the present invention is that because the heated length can be shorter, the vertex angle can be as large as 10-15°, ca. 10 times the angles taught in the art. Actual practice in fabricating Y-branches according to the teachings of the art normally results in the creation of un-etched material at the vertex, which greatly aggravates PDL in the propagated signal. As emphasized in Mossburger et al, op.cit., having a "perfect" vertex is critical to performance. With the larger vertex angles of the present invention, it is much easier to achieve sharp definition of the vertex and control of the shape with concomitant reduction in PDL.

Figure 1C:
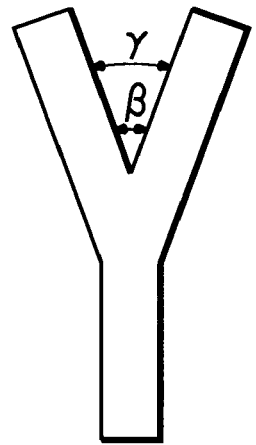

One particularly surprising aspect of the present invention is that contrary to the teachings of Moosburger, a blunted vertex such as that depicted in FIG. 1c can result in reduced PDL with no significant light loss.

One of skill in the art will appreciate that the heating profile of choice will depend upon many factors including the specific choice of materials from which the waveguide is fabricated, the architecture of the waveguide, whether or not there is an intervening layer of cladding between heater and core, the wavelength of the propagating signal, the rapidity of switching desired, whether or not it is desired to employ the device partly or exclusively as a variable optical attenuator, and so forth.

It is desirable in the practice of the invention that the heating profile be a smoothly varying function of position on the surface of the waveguide being heated. Sharp discontinuities in heat flux must be avoided in order to avoid sudden changes in refractive index in the waveguide, which can result in mode matching losses.

In the practice of the present invention it has been found that power levels of 10 to 50 mW are effective in causing switching in polymers characterized by dn/dT in the range of −2 to −5×10$^{-4}$/° C. Examples of such polymers include but are not limited to polyacrylates, polyfluoroacrylates, and polychloroacrylates. Power levels of 30-150 mW are found to be effective with polymers characterized by dn/dT of −0.5 to less than −2×10$^{-4}$/° C. in absolute value. Examples of such polymers include but are not limited to polycarbonate and polymethylmethacrylate. In a typical embodiment of the present invention, the entire waveguide is made from the same polymeric system.

In the practice of the present invention, temperature increases in the core may range from 10 to 100° C. The high temperatures are generally narrowly localized, and are beneficially achieved by use of a heater having a relatively narrow "neck" area. As will be understood by one of skill in the art, resistance in a metallic conductor increases inversely with cross-sectional area. Thus for a given power input to the heater, the localized heating in the narrow cross-section will be highest.

The present invention is operable with any convenient heating means such as is known in the art. This can include induction heating, radiative heating, and electrical resistive heating. From the standpoint of simplicity of implementation, electrical resistive heating is preferred. Electrical resistive heating may be accomplished according to means wellknown in the art. In one approach, a thin metal strip is sputter coated onto the waveguide using a mask to prepare the heater shape desired. When the heater is not disposed on the surface of the output branch over its entire length, it is deposited on top of that part of the overclad on the chip where there is no core underneath.

Alternatively, the heater may be formed by evaporation or any other metal deposition process.

Suitable metals for electrical resistive heating according to the present invention include but are not limited to chromium, titanium, aluminum, nickel, gold, platinum. Preferred are chromium, titanium, nickel, and gold. The spatially non-uniform heating according to the present invention may be accomplished by applying a thin film heating strip of variable cross-sectional area onto the waveguide surface at any convenient location thereupon The present invention places no specific limits on the manner in which spatially non-uniform heating may be accomplished. In one embodiment of the present invention, spatially non-uniform heating is beneficially accomplished by employing a heating means of uniform design which is disposed with respect to the waveguide in a manner which results in the imposition of a non-uniform heat flux onto the waveguide surface. Illustrative of this embodiment are the configurations shown in FIGS. 4. One of skill in the art will appreciate that many other embodiments of the same generic nature. Such embodiments include but are not limited to rectangular heaters with curved waveguides, rectangular heaters with straight waveguides, curved heaters with straight waveguides, and curved or rectangular heaters with straight waveguides wherein the vertex of said Y-branch is blunted.

FIG. 4 depicts an embodiment of the invention wherein the output waveguide is curved, the heater is uniform in design, and the heat-flux delivered to the waveguide surface is a smoothly continuous function of the proximity of the heater to the waveguide surface. In this case, the greatest amount of heating occurs at the point farthest from the vertex. Two slightly different embodiments are depicted, differing by the slightly different shapes of the heaters.

One of skill in the art will appreciate that any of the Y-branch designs depicted in FIGS. 1a-1c, and the others as described hereinabove, can be substituted for the Y-branch depicted in FIGS. 4a and 4b with no loss of effectiveness in the practice of the present invention.

In a preferred embodiment of the present invention, a heater wherein the cross-sectional area thereof is not constant is disposed along the length of the output waveguides. In this embodiment, a non-uniform heat flux is imposed upon the waveguide surface by virtue of the higher temperatures realized in the portions of the heater having smaller cross-sectional areas. In a more preferred embodiment, the heater is in the shape of a bow-tie wherein a rectangular portion gives way at each end in the longer dimension to a triangular portion, the two triangular portions being joined at their truncated apexes. In this embodiment, the heat flux incident upon the surface of the waveguide increases continuously along the long dimension of the heater as the cross-sectional area narrows until it reaches a peak at the narrowest point, and then continuously decreases with increasing distance from the narrowest point along the long dimension of the waveguide. In the most preferred embodiment hereof, the narrowest portion of the heater is disposed in close proximity to the vertex, thereby subjecting the region of the vertex to the highest temperature. Because of the continuous nature of the effect herein realized, one of skill in the art will understand that a small positional deviation of the narrowest point on the heater from the closest point of approach to the vertex will have little effect on the practive of the present invention.

The most preferred embodiment is depicted in FIGS. 5a and 5b wherein two slightly different bow-tie designs are placed along the straight output waveguides wherein the Y-branch depicted is that in FIG. 1c wherein the angle β is 0.2-4.0° preferably 0.4-1.0°.

One of skill in the art will appreciate that a further embodiment will encompass both spatial separation of the heater and the waveguide and a heater of non-uniform cross-section. There is no limit according to the present invention to the possible heater designs, the number of ways the heater can be disposed with respect to the waveguide, or the combinations thereof with each other in order to practice the present invention.

One of skill in the art will further appreciate that the requisite heating profile of the invention may be obtained by employing a plurality of individually uniform heaters along the length of the output branch, at least two of said heaters being heated to different temperatures. This embodiment is however less preferred because of the multiplicity of wires and controllers which would be required for its implementation.

Placement of the heaters according to the present invention may have a significant impact on the operability of the present invention. If a heater is positioned on the top surface of an output branch, it will be in very close proximity to the other output branch, and it is highly likely that some undesirable degree of heating will occur in that output branch which is not intended to be heated. For this reason it is highly desirable that the heat flux from the heaters be directed to the outside edge of the respective branches in order to place as much as possible of the thermally insulating waveguide between the heated surface and the adjacent waveguide. Thus lateral positioning of the heater is an important consideration.

The Y-branch of the invention may be beneficially employed not only as a digital optical spatial switch but as a variable optical attenuator (VOA). This is accomplished by heating the output branches to temperatures below the threshold temperature for switching. In the operation of the VOA according to the present invention, the degree of transfer of power from one branch to the other is continuously varied by continuously varying the heat input until the stage at which essentially all the optical power is transferred to one output waveguide, after which further heating has no effect—the digital switching region. When the Y-branch is operated as a VOA, a first arm is heated to achieve attenuation up to 3 dB or 50% (in polymer, said first arm is not the output arm), and the second arm is heated to achieve attenuation above 3 dB (in polymer, said second arm is the output arm). The heat may then be subject to small adjustments to alter the relative intensity of propagation in the two branches.

EXAMPLES

Example 1

In this Example, the following terms are employed:

The composition designated B3 was prepared by combining 94% by weight of ethoxylated perfluoropolyether diacrylate (MW1100), 4% by weight of di-trimethylolpropane tetraacrylate, and 2% by weight of Darocur 1173, a photoinitiator available from Ciba-Geigy.

The composition designated BF3 was prepared by combining 98% by weight of ethoxylated perfluoropolyether diacrylate (MW1100) and 2% by weight of Darocur 1173.

The composition designated C3 was prepared by combining 91% by weight of ethoxylated perfluoropolyether diacrylate (MW1100), 6.5% by weight of di-trimethylolpropane tetra-acrylate, 2% by weight of Darocur1173, and 0.5% by weight of Darocur 4265 a different photoinitiator available from Ciba Geigy.

The following fabrication process was performed twice, once with mask designated P03, once with mask designated P05 (see FIG. 2 for structures of each mask).

A 6-inch oxidized silicon wafer (substrate) was cleaned with KOH, then treated with (3-acryloxypropyl)trichlorosilane (Gelest). Polymer waveguides were formed on the wafer using negative-tone photosensitive monomers in the following way: 2 ml. of the BF-3 composition was deposited on the wafer which was then spun on a CEE-100 spin-coater (Brewer Scientific) at 1000 rpm for 13 seconds to form a 10-μm-thick BF3 underclad layer. The coating so prepared was cured with 350 nm UV light.(the Hg-i line) from a 1000 Watt mercury arc lamp in a nitrogen atmosphere and a pressure of 0.02 torr. A C3 core layer was deposited in a similar manner and 7-μm×7-μm-cross-section Y-branched waveguides were patterned in it by shining 350 nm UV light (the Hg-i line) from a 1000 Watt mercury arc lamp through a dark-field photomask then developing the unexposed region with ethyl acetate (HPLC grade, Fisher Scientific Co.). In the Y-branches so prepared, shown schematically in FIG. 2b, the initial angle of divergence of the branches was 0.6°; the branches curved outwards to an angle of 1.5° at a branch separation of 45 micrometers where the heaters ended. 3 ml of the B3 composition was placed on the patterned wafer and spin coated at 700 rpm for 14 second on the CEE-100 to form a 17 micrometer-thick B3 overclad layer. The coated layer so prepared was cured using the Hg-i line from the 1000 Watt mercury arc lamp in a nitrogen atmosphere at atmospheric pressure.

Heaters were formed by sputter-depositing onto the polymer-coated wafer successive layers of Cr and Au that were at respective thicknesses of 10/200 nanometers to form a two-layer heater stack having an over-thickness of 210 nm]. Said heater stack was patterned photolithographically using positive photoresist (Type 1808 available from Shipley) and a clear-field photomask followed by acid etching to form heaters and the base of interconnects/wire bonding pads. An electroplating base of Ti/Au was sputter-deposited on top of the heater stack and a positive photoresist (Shipley SJR5740) applied thereto by spin-coating. UV-exposure with a dark-field photomask exposed the base of interconnects and wire bonding pads. Electroplating with gold was then performed. Finally said positive photoresist was developed and said electroplating base was acid etched, resulting in a wafer populated with chips having thermo-optic Y-branch-based variable optical attenuators (VOA's).

Each of wafers P03 and P05 was diced. P03 chips were 20-mm long and P05 chips were 11-mm long. One specimen of each of the so-prepared Y-branch thermo-optic devices was evaluated as a VOA. The P03 device had the following performance characteristics: insertion loss at minimum attenuation=1.0 dB, polarization-dependent loss (PDL) at 15 dB attenuation=0.5 dB. The P05 device had the following performance characteristics: insertion loss at minimum attenuation=0.65 dB, polarization-dependent loss (PDL) at 15 dB attenuation=0.2 dB.

Example 2

Figure 6:
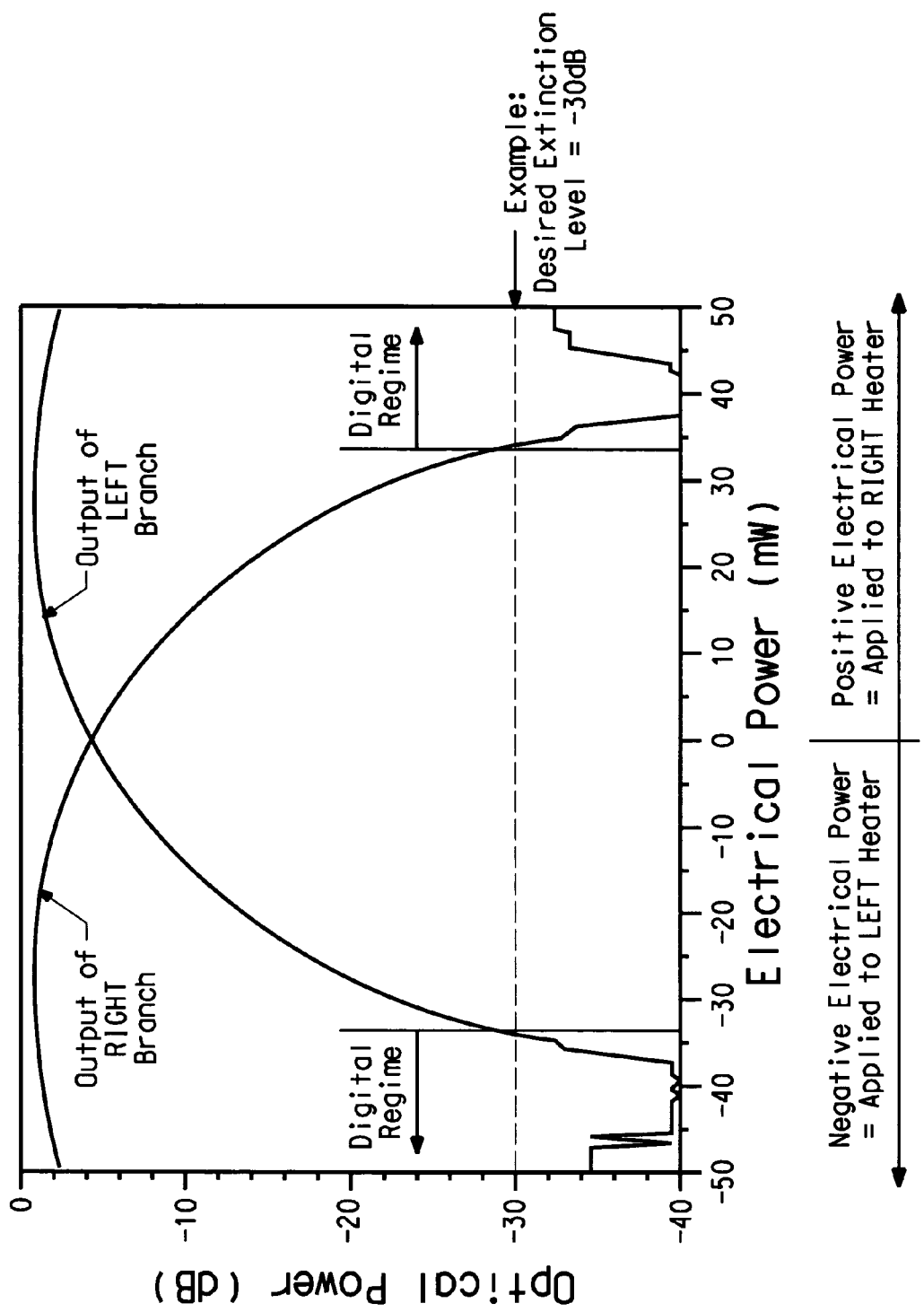
FIG. 6 is a graph of digital optical switch characteristics.

A second Y-branch specimen, prepared in a manner identical to that in Example 1, was evaluated according to the following protocol: The measurement was done in 2 steps:

1. 1.55 micrometer wavelength light was coupled from a glass optical fiber input into the Y-branch trunk and after traversing the device the light was couple to a glass optical fiber at the output of the 'right' branch and was sent to a photodetector. Electrical power was applied to the left branch heater and was changed continuously from 50 mW to 0 mW, then electrical power was applied to the right heater and was changed continuously from 0 mW to 50 mW. The optical power attenuation measured at the photodetector is indicated by the blue line in FIG. 6.

2. Light was launched as in the preceding paragraph. but was coupled to a photodetector at the output of the 'left' branch Electrical power was applied to the right heater and was changed continuously from 50 mW to 0 mW, then electrical power was applied to the left heater and was changed continuously from 0 mW to 50 mW. The optical power attenuation measured at the photodetector is indicated by the green line in FIG. 6.

What is claimed is:

1. A 1×2 planar optical waveguide signal splitter in the form of a Y-branch comprising a trunk and two branches conjoined thereto to form a vertex, said branches diverging from one another, each of said branches having a surface, at least one of said branches being provided with a heating means wherein the heating means is applied onto the waveguide surface, said heating means having non-uniform cross-sectional areas wherein the cross-sectional areas narrow until the areas reach the narrowest portion disposed in close proximity to the vertex and being disposed with respect to said at least one of said branches such that upon activation of said heating means, a heat flux will be incident upon said at least one of said branches wherein said heat flux produces upon the surface of said branch a heating profile that is a smoothly varying function of position on said surface.

2. The 1×2 planar optical waveguide signal splitter of claim 1 wherein each of said branches further comprises an outer edge and wherein further said spatially non-uniform heat flux will be incident preponderantly on said outer edge of said at least one of said branches.

3. The 1×2 planar optical waveguide signal splitter of claim 1 wherein said vertex is characterized by an angle of 0.05-4°.

4. The 1×2 planar optical waveguide signal splitter of claim 3 wherein said vertex is characterized by an angle of 0.4-1°.

5. The 1×2 planar optical waveguide signal splitter of claim 1 further comprising a polymeric core.

6. The 1×2 planar optical waveguide signal splitter of claim 5 wherein said polymeric core comprises a polymer selected from the group consisting of polyacrylates, polyfluoroacrylates, polychloroacrylates, polymethacrylates, and polycarbonates.

7. The 1×2 planar optical waveguide signal splitter of claim 6 wherein the polymer is a polyfluoroacrylate.

8. The 1×2 planar optical waveguide signal splitter of claim 1 wherein said heating means is an electrical resistance heater.

9. The 1×2 planar optical waveguide signal splitter of claim 1 wherein said cross-sectional area has a minimum area, said heater being disposed such that the distance between said vertex and said minimum area is a minimum.

10. A digital optical spatial switch comprising the 1×2 planar optical waveguide signal splitter of claim 1.

11. A variable optical attenuator comprising the 1×2 planar optical waveguide signal splitter of claim 1.

12. A method for splitting an optical signal, the method comprising:
(a) disposing in the propagation path of a propagating optical signal a 1×2 planar optical waveguide signal splitter in the form of a Y-branch comprising a trunk and two branches conjoined thereto to form a vertex said branches diverging from one another, at least one of said branches being provided with a heating means wherein the heating means is applied onto the waveguide surface, said heating means having non-uniform cross-sectional areas wherein the cross-sectional areas narrow until the areas reach the narrowest portion disposed in close proximity to the vertex and being disposed with respect to said at least one of said branches such that upon activation of said heating means, a heat flux will be incident upon said at least one of said branches wherein said heat flux produces upon the surface of said branch a heating profile that is a smoothly varying function of position on said surface; and
(b) energizing said heating means to effect the imposition of a spatially non uniform heat-flux upon the surface of said at least one of said branches in order to effect a rise in the temperature of said at least one of said branches an amount sufficient to cause a change in the relative intensity of the propagating optical signal in the two said branches.

13. The method of claim 12 wherein each of said branches further comprises an outer edge and wherein further said spatially non-uniform heat flux is imposed preponderantly on said outer edge of said at least one of said branches.

14. The method of claim 12 wherein said vertex is characterized by an angle of 0.05-4°.

15. The method of claim 14 wherein said vertex is characterized by an angle of 0.4-1°.

16. The method of claim 14 wherein said polymeric core comprises a polymer selected from the group consisting of polyacrylates, polyfluoroacrylates, polymethacrylates, and polycarbonates.

17. The method of claim 16 wherein the polymer is a polyfluoroacrylate.

18. The method of claim 12 wherein said rise in temperature is sufficient to effect a digital optical switching function.

19. The method of claim 12 wherein said rise in temperature is insufficient to effect a digital optical switching function, so that said 1×2 planar optical waveguide signal splitter serves as a variable optical attenuator.

20. The method of claim 12 wherein said 1×2 planar optical waveguide signal splitter further comprises a polymeric core.

21. The method of claim 12 wherein said heating means is an electrical resistance heater.

22. The method of claim 12 wherein the highest heat flux is imposed at a minimum distance from said vertex.

* * * * *